(12) United States Patent
Cottrell

(10) Patent No.: US 8,929,721 B2
(45) Date of Patent: *Jan. 6, 2015

(54) METHODS FOR IDENTIFICATION OF HIGHLIGHT GAME EVENTS AND AUTOMATED GENERATION OF VIDEOS FOR SAME

(75) Inventor: David Cottrell, Foster City, CA (US)

(73) Assignee: Sony Computer Engineering America LLC, San Mateo, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/365,140

(22) Filed: Feb. 2, 2012

(65) Prior Publication Data

US 2012/0134651 A1        May 31, 2012

Related U.S. Application Data

(63) Continuation of application No. 12/370,327, filed on Feb. 12, 2009, now Pat. No. 8,515,253.

(60) Provisional application No. 61/029,261, filed on Feb. 15, 2008.

(51) Int. Cl.
*A63F 13/00*        (2014.01)
*G11B 27/034*      (2006.01)

(52) U.S. Cl.
CPC ............. *G11B 27/034* (2013.01); *A63F 13/00* (2013.01); *A63F 2300/634* (2013.01)
USPC .......................................... 386/278; 386/248

(58) Field of Classification Search
USPC ....................................................... 386/278
See application file for complete search history.

(56) References Cited

U.S. PATENT DOCUMENTS

| 5,795,228 A | 8/1998 | Trumbull et al. ............... 463/42 |
| 5,857,190 A | 1/1999 | Brown ............................ 707/10 |

(Continued)

FOREIGN PATENT DOCUMENTS

| JP | 2000051518 A | 2/2000 | ............. A63F 13/10 |
| JP | 2003320170 A | 11/2002 | ............. A63F 13/12 |

(Continued)

OTHER PUBLICATIONS

Wang et. al., "Automatic Generation of Personalized Music Sports Video", 2005, ACM, Multimedia '05 Proceedings of the 13th annual ACM international conference on Multimedia, pp. 735-744.*

(Continued)

*Primary Examiner* — Luu Pham
*Assistant Examiner* — Ali Shayanfar
(74) *Attorney, Agent, or Firm* — Martine Penilla Group, LLP

(57) ABSTRACT

Methods, systems and computer readable media for automated creation of videos for interactive entertainment involving at least one individual, based on events that occur within that interactive entertainment are provided. One method includes storing a video history of a session of the interactive entertainment for an individual and examining the interactive entertainment for the session to identify events designated as significant. The designation as significant for each event being predefined to meet a threshold. Then, selecting segments of video from the video history of the session of the interactive entertainment. The selected segments being for a set of the identified events. The method then generates a video defined from the selected segments of video. The video is playable to show the selected segments of video in a selected order for the individual and saving the video.

19 Claims, 13 Drawing Sheets

(56) References Cited

U.S. PATENT DOCUMENTS

| | | |
|---|---|---|
| 6,257,982 B1 | 7/2001 | Rider et al. ............... 463/31 |
| 6,634,949 B1 | 10/2003 | Briggs et al. ............... 463/42 |
| 6,699,127 B1 | 3/2004 | Lobb et al. ............... 463/43 |
| 6,999,083 B2 | 2/2006 | Wong et al. ............... 345/473 |
| 2002/0087595 A1* | 7/2002 | Friedman et al. ............... 707/512 |
| 2002/0147985 A1* | 10/2002 | Miyajima et al. ............... 725/109 |
| 2003/0038805 A1* | 2/2003 | Wong et al. ............... 345/473 |
| 2004/0040041 A1* | 2/2004 | Crawford ............... 725/88 |
| 2006/0247055 A1* | 11/2006 | O'Kelley et al. ............... 463/42 |
| 2008/0030300 A1* | 2/2008 | Naito et al. ............... 340/5.1 |
| 2008/0045284 A1* | 2/2008 | Assaad et al. ............... 463/9 |
| 2008/0215583 A1* | 9/2008 | Gunawardena et al. ............... 707/7 |
| 2009/0063496 A1* | 3/2009 | Cunningham et al. ............... 707/10 |
| 2009/0210395 A1* | 8/2009 | Sedam ............... 707/3 |
| 2009/0247288 A1* | 10/2009 | Phan et al. ............... 463/25 |
| 2009/0286655 A1* | 11/2009 | Parks et al. ............... 482/9 |
| 2010/0298040 A1* | 11/2010 | Joshi et al. ............... 463/16 |

FOREIGN PATENT DOCUMENTS

| | | | |
|---|---|---|---|
| JP | 2003320170 A | 11/2003 | ............... A63F 13/12 |
| JP | 2006-006853 | 12/2006 | ............... A63F 13/12 |

OTHER PUBLICATIONS

Changsheng et. al., "Using Webcast Text for Semantic Event Detection in Broadcast Sports Video" ,2008, IEEE,vol. 10, No. 7,pp. 1342-1355.*

* cited by examiner

Player 1 Spawns

Player 1 Picks up mines

Player 2 Spawns

Player 2 Enters Jeep

Player 1 Lays down mine

Player 2 Drives in mine path

*Player 1 watches player 2 blowup on the mine*

*Player 2's body shown*

P1 Spawn

P1 Picks up mines, Player 2 spawns in Picture in Picture image (PIP)

Player 1 Lays down mine,
Player 2 enters jeep in PIP

Player 2 Drives in mine path

Player 1 watches player 2
blowup on the mine

Player 2's body shown

US 8,929,721 B2

METHODS FOR IDENTIFICATION OF HIGHLIGHT GAME EVENTS AND AUTOMATED GENERATION OF VIDEOS FOR SAME

CLAIM OF PRIORITY

This application is a continuation application under 35 USC 120 and claims priority from co-pending U.S. application Ser. No. 12/370,327, filed on Feb. 12, 2009 now U.S Pat. No. 8,515,253, which claims priority to U.S. Provisional Patent Application No. 61/029,261, filed on Feb. 15, 2008, both of which are incorporated herein by reference.

FIELD OF THE INVENTION

Embodiments of this invention relate to the creation of videos for interactive entertainment. More particularly, embodiments of this invention relate to the automated creation of videos for interactive entertainment based on events that occur within that entertainment.

BACKGROUND OF THE INVENTION

Multiplayer video games, such as the Warhawk™ game, which is played on the Sony PS3 game console (see, for example, www.us.playstation.com/Warhawk/) provide an interactive entertainment experience. Such interaction typically takes the form of a competitive group or team activity. For example, in Warhawk™ such interaction takes place during a virtual combat experience. Certain events during any particular game play sequence are memorable to the game participants because of, for example, the skill exhibited by one or more participants during such event or the entertainment value of such event. Thus, YouTube currently shows 1580 postings of Warhawk™ videos. These videos are either demonstration videos or user experience videos, the latter typically comprising video tape recordings made by a participant or spectator from a monitor or television during game play. These YouTube videos are very popular, having thousands, and even hundreds of thousands, views.

Unfortunately, the most effective current approach to capturing game play is through video taping and other such means. Because videos produced in this manner are unedited, analog screen captures which present game play in a linear fashion, the most interesting events in a game play sequence are not highlighted or assembled into a meaningful, entertaining narrative. Nor do current video capture techniques provide for more than the perspective of the immediate participant or spectator who is performing the video capture.

Thus, there is a need in the art, for a technique that allows for automated creation of videos for interactive entertainment based on events that occur within that entertainment.

SUMMARY OF THE INVENTION

The disadvantages associated with the prior art are overcome by embodiments of the present invention directed to a technique that allows for automated creation of videos for interactive entertainment based on events that occur within that entertainment. Thus, an embodiment of the invention concerns automated movie creation based on game events. Previously replay generation was predominantly unintelligent, namely it presented the historical data linearly. The presently preferred embodiment of the invention provides a technique that attempts to find the interesting moments in a game and presents them in several interesting ways.

Methods, systems and computer readable media for automated creation of videos for interactive entertainment involving at least one individual, based on events that occur within that interactive entertainment are provided. One method includes storing a video history of a session of the interactive entertainment for an individual and examining the interactive entertainment for the session to identify events designated as significant. The designation as significant for each event being predefined to meet a threshold. Then, selecting segments of video from the video history of the session of the interactive entertainment. The selected segments being for a set of the identified events. The method then generates a video defined from the selected segments of video. The video is playable to show the selected segments of video in a selected order for the individual and saving the video.

Choosing which events to use to create the movie is a form of artificial intelligence. In one embodiment of the invention, the game designates a series of events that can occur within a play session. The game must keep track of enough replay data such that these discrete events can be identified. Upon replay generation, the game searches over the historical data for that session and identifies the events that have occurred. The game may present several combinations of views of those events. For example, the game can create a highlights reel of the entire play session by linearly displaying several of the discovered events. Another embodiment allows the player to choose which events to view. The events could also be categorized, allowing the player to view a collection of a selected event type, such as all flag capture videos or all long-distance shots.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

An embodiment of the invention concerns automated movie creation based on game events. Previously replay generation was predominantly unintelligent, namely it presented the historical data linearly. The presently preferred embodiment of the invention provides a technique that attempts to find the interesting moments in a game and presents them in several interesting ways.

Choosing which events to use to create the movie is a form of artificial intelligence. In one embodiment of the invention, the game designates a series of events that can occur within a play session. The game must keep track of enough replay data such that these discrete events can be identified. These discrete events, collectively, amount to an interactive entertainment history for a particular game play session. Upon replay generation, the game searches over the historical data for that session and identifies notable events that have occurred, for example based upon user voting and/or upon favorable comparison with a predetermined set of notable events. The game may present several combinations of views of those events. For example, the game can create a highlights reel of the entire play session by linearly displaying several of the discovered events. Another embodiment allows the player to chose which events to view. The events could also be categorized, allowing the player to view a collection of a selected event type, such as all flag capture videos or all long-distance shots.

Figure 1:
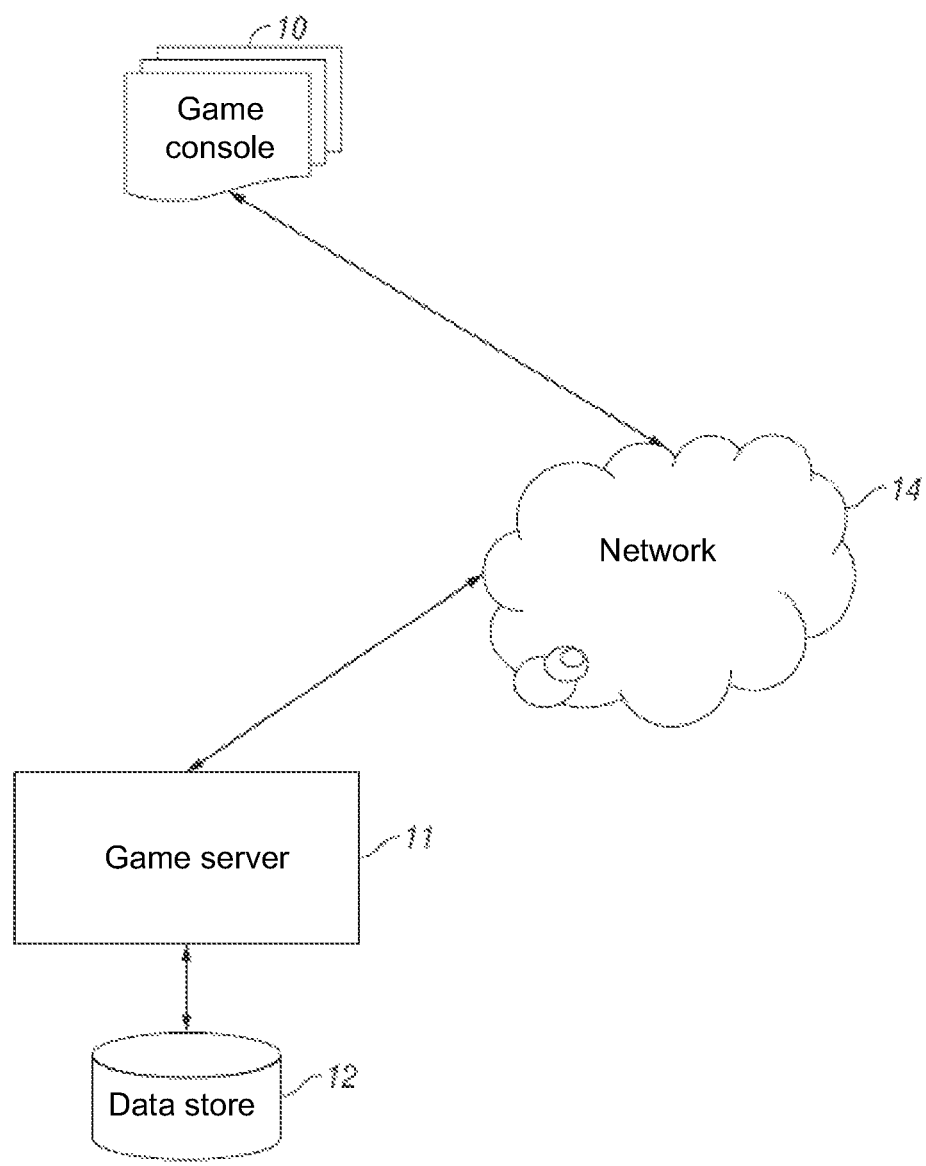
FIG. 1 is a block schematic diagram showing a video game system architecture according to an embodiment of the invention.

FIG. 1 is a block schematic diagram showing a video game system architecture according to an embodiment of the invention. One embodiment of the invention is implemented in the Sony PlayStation® 3 game console. Those skilled in the art will recognize that there is significant skill in the game developer community in connection with game consoles, such as the PlayStation® 3, and that application programming interfaces for such consoles are available, for example, in respective software development kits for developers. Thus, those skilled in the art will also recognize that the various techniques taught herein can be implemented in a game console, such as the PlayStation® 3, using known programming techniques. See, for example, Rabin, Steve, *Introduction to Game Development* (*Game Development Series*), Charles River Media (June 2005).

While the invention is described herein with regard to the Sony PlayStation® 3 and games that are intended for use on such game console, those skilled in the art will appreciate that developers for other game consoles can readily apply the teachings herein to such other games consoles. Accordingly, the invention herein is in no way limited to the specific examples provided herein.

In FIG. 1, two or more players access a game server 11 via a network 14, such as the Internet. Each player uses a game console 10, such as the Sony PlayStation® 3. The game server includes a data store 12 that stores information about each player, such as a profile, game statistics, and the like, as well as a game history comprising, in one embodiment, a timeline that contains events that occurred during a game session. These events can be significant events and/or user designated events, as described in greater detail below. The game server also includes a mechanism for assembling a game play video that includes the events contained in the timeline (discussed below). In another embodiment, a history may be maintained on the game console in addition to, or instead of, on the game server. Likewise, the game console can include a mechanism for assembling a game play video that includes events contained in the timeline.

Figure 2:
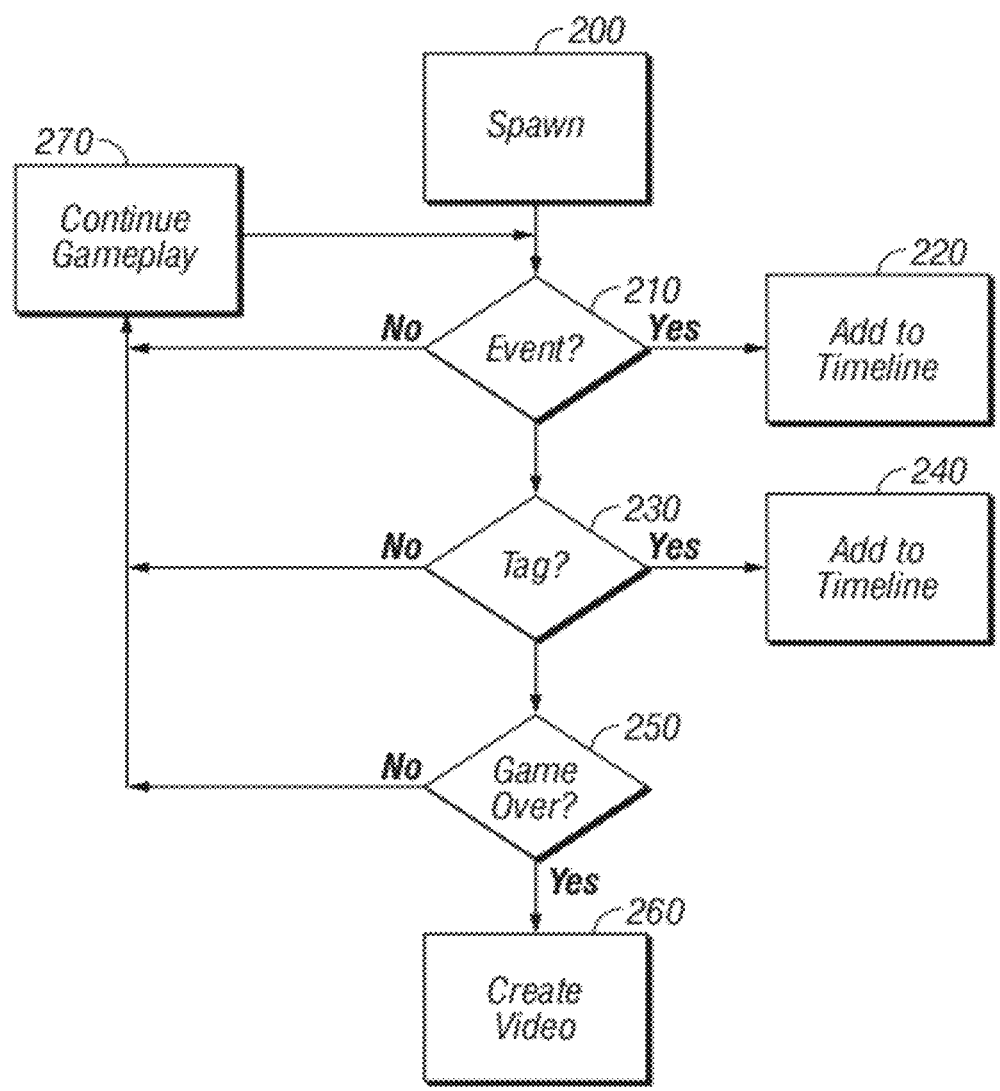
FIG. 2 is a logic diagram showing operation of the invention during game play according to an embodiment of the invention.

FIG. 2 is a logic diagram showing operation of the invention during game play according to an embodiment of the invention. At the beginning of game play, a user enters the game by spawning (200). As game play progresses (270), various events occur, such as crashes, kills, deaths, and the like (210). As these events occur, they are noted in a history of the game that is stored, as described above, along a game timeline (220). These events are noted for each player. In one embodiment, events that occur between two players, such as one player killing another player, are correlated between the players to capture the event from each player's perspective. In another embodiment, each player may decide to designate an event as significant by tagging it (230), for example by pressing a button or combination of button on a game controller. These tags are also logged to the timeline (240). When the game is over (250), a video of game highlights is generated (260).

Figure 3:
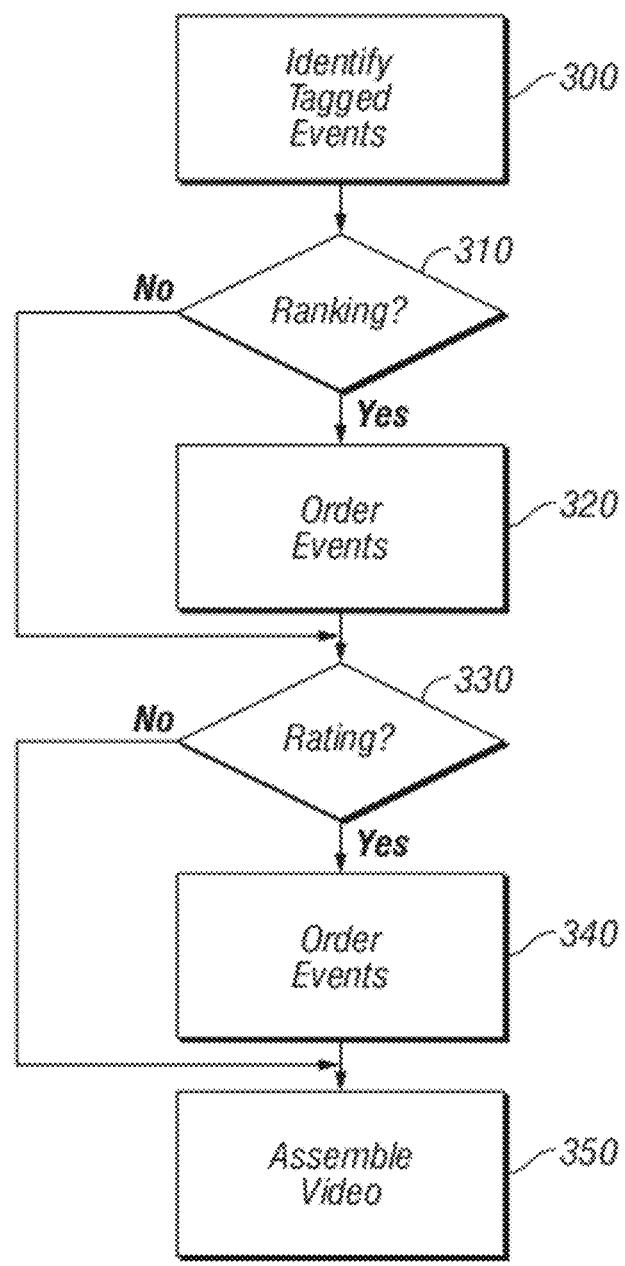
FIG. 3 is a logic diagram showing operation of the invention during assembly of a game highlight video according to an embodiment of the invention.

FIG. 3 is a logic diagram showing operation of the invention during assembly of a game highlight video according to an embodiment of the invention. Once a game is completed, a video of the game highlights can be generated, either at the request of one or more users, under control of one or more users, or it may be generated automatically in all cases and saved to a game highlight archive for later viewing or for use, in whole or part, in generating additional videos.

At the start of the video assembly process, all tagged events are identified (300).

The tagged events in some embodiments can indicate a ranking (310) of the events based upon such factors as the significance of the event, e.g. a flag capture or multiple kill, the difficulty of accomplishing a task associated with the event, the entertainment value of the event, and the like. If such events are present, then the events are ordered (320) in accordance with various factors, such as significance or entertainment value.

The tagged events in some embodiments can also include user generated tags, e.g. based upon voting by one or more users, such as an indication that an event is entertaining, for example when compiling a list of highlights, as designated, for example, by user selection of a thumb's up icon, button, or the like; or an indication that an event is not entertaining, for example when voting to select highlights from among a list of finalist events, as designated, for example, by user selection of a thumb's down icon, button, or the like, which indicate a rating of the event by the players (330). If such rating events are present, then the events are ordered (340) according to such criteria as number of tags per event, prominence of the players who tagged an event, significance of the event, whether the number of tags exceed a minimum threshold. This embodiment of the invention provides for user interaction with the highlight selection process, e.g. it provides a mechanism that identifies the overall positive or negative affirmation by one or more users of a sequence of events in an interactive presentation, such as game play, at an instant in time. In this embodiment, the user is provided with a mechanism, such as a game controller button press, by which events are designated as being of particular interest. Thus, this embodiment of the invention provides a voting scheme analogous to the thumbs up rating system described above. The game players select those events that are of greatest interest during game play. User selection tags these events in a game play history. After conclusion of game play, the system collates the user tags and assembles a highlights video of the game. A threshold may be established that must be met before a tagged event is considered for inclusion in a video. The system may apply various heuristics to the assembly process, such as ranking events by popularity, as indicated by the number of tags associated with an event. Further, the system may limit the video to a specific number of tagged events, such as the top five ranked events. A weighting may also be applied to the events, such that some tagged events may have greater weighting than other tagged events. For example, each tag in a flag capture event may be weighted greater than tags in a kill event. Thus, ranking and selection of events for presentation in a video is multidimensional.

When a manual tag event is selected via the user during game play, the system gives higher weight to the events that occurred in the previous N seconds. Because the system might not recognize the event as interesting, this secondary mechanism allows the player to identify interesting events. For example, if one person jumps off of a ledge and lands in a moving vehicle, a player could tag that action as interesting. The designers of the game could see user created videos that have interesting content, and patch the future version of the game to include criteria, such as jumping into moving vehicles, into the automated system as well.

Once the events are ordered, based upon their ranking and rating for example, the video is assembled (350). The assembly process proceeds in accordance with any of various user or programmed decisions as to which events to present, how many events to present, how much of an event should be presented, and the like. For example, some events may require inclusion of actions that lead up to the event to provide context, other events may require presentation from the perspective of more than one player, and the like. Further, some events may be more entertaining or significant than others. Thus, more popular events, as indicated by user ratings, may be promoted over more significant events, as indicated by rankings. Alternatively, one or more of the various ranking and rating factors may be used as a weighting value for one or more of the other factors. Thus, while explosions, for example, may be more significant than crashed for purposes of ranking, a particular crash may be so popular, based upon it rating, that it is promoted over an explosion and included in a video instead of the explosion.

Figure 4:
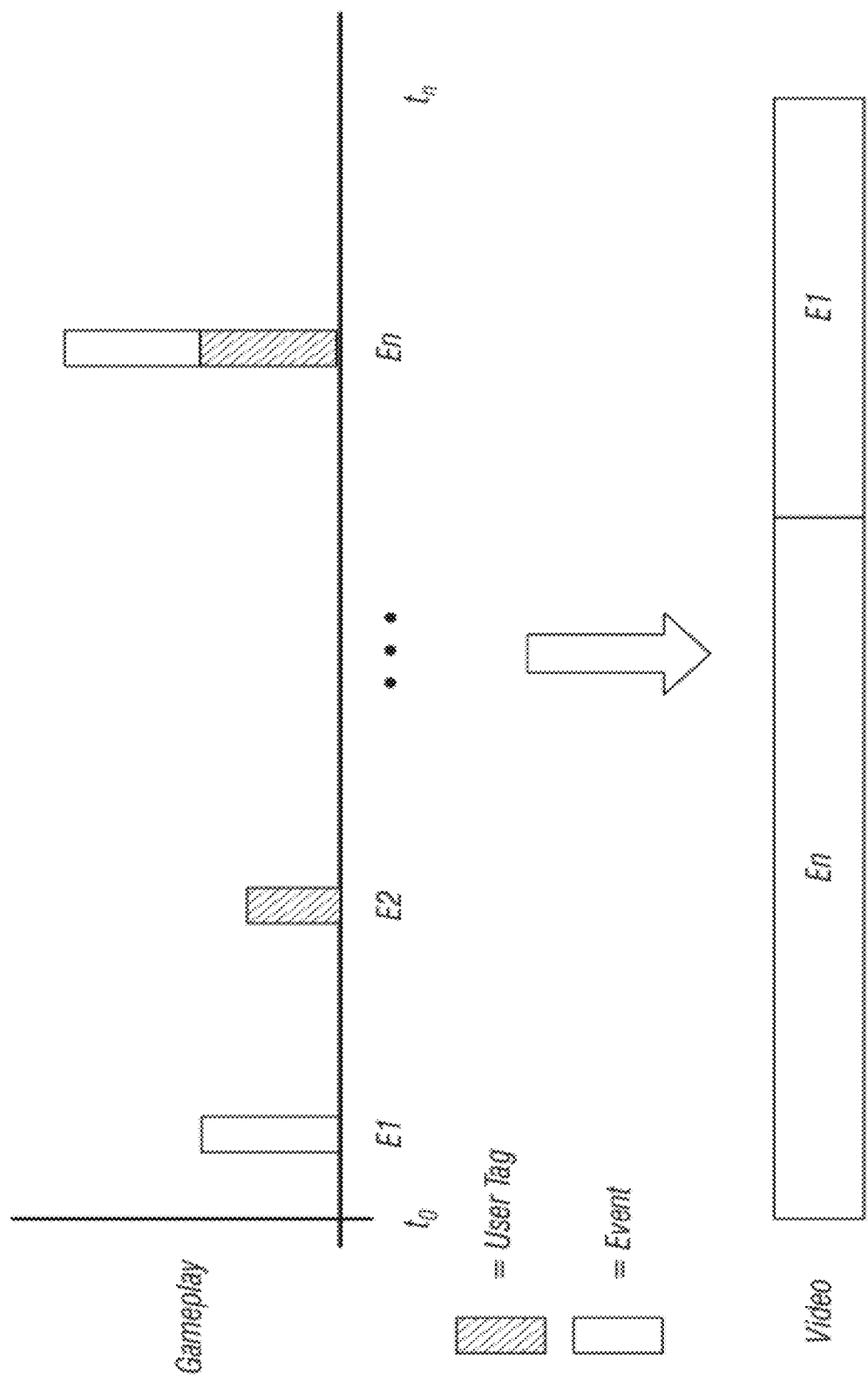
FIG. 4 is a schematic diagram showing a game play timeline and video content that is selected for inclusion in a highlight video according to an embodiment of the invention.

FIG. 4 is a schematic diagram showing a game play timeline and video content that is selected for inclusion in a highlight video according to an embodiment of the invention. Those skilled in the art of programming game consoles will appreciate that a history of game play and a designation of significant events can be captured during such game play and stored in an electronic storage. Thereafter, such history may be retrieved and, using event designation information in the history, such as player names, coordinates in the game space, and the like, the game event, and actions leading up to the event, can be recreated. In FIG. 4, a timeline is shown in which events E1, E2, and En occur during game play. It can be seen that the tag for event E1 is based upon a simple game event, while the tag for event E2 is a user tag, and the tag for event En is based upon both game events and user tags. FIG. 4 shows that the value of event En is greater than that of the other captured game events and, thus is given a more prominent position in the resulting video. Event E1 has the second greatest value and is also placed in the video, but in a lesser position; event E2 has least significance and, in the example shown in FIG. 4, does not meet a threshold for inclusion in the video.

Examples of Events are as Follows

Example Capture the Flag Events
  Flag Capture
  Taking of a Flag
  Killing of a flag carrier
  Long distance shot
  A Mine blows up
  A player drops a mine
Example Deathmatch events
  Long distance shot
  5 kill streak
  Entire session of player with the most kills
  Entire session of player with the worst score
  A mine blows up and kills a player
  A player jumps off a hill and enters a moving vehicle
  A player pushes another player off a hill into water, killing that player Once an event has been discovered, a secondary step may build a replay of the events that led up to the event. For example, the Table 1 below illustrates one player placing mines that blow up two other players. The main events that the video is looking to capture are player 2 and player 3 being blown up by mines. From the point of mine impact, the video is crafted to show the basic steps that led up to the impacts, as well as several seconds past the impacts.

TABLE 1

Time Line for Mine Explosion

| TIME STAMP (M:SS) | PLAYER 1 | PLAYER 2 | PLAYER 3 |
| --- | --- | --- | --- |
| 0:00 | Spawn, Walk | Spawn | Spawn |
| 0:05 | | Walk | Walk |
| 0:15 | | | Get in tank, drive |
| 0:21 | Pick up mines | | |
| 0:22 | | Get in jeep, drive | |
| 0:26 | Get in plane | | |
| 0:36 | Land plane | Launch grenade at player 3 tank | |
| 0:39 | | Get out of jeep | |
| 0:48 | Place mine 1 | | |
| 0:60 | Place mine 2 | | |
| 0:71 | | Walk over mine 1, blow up | |
| 0:74 | | Body lands | |
| 0:91 | | | Drive over mine 2, blow up |
| 0:97 | | | Body lands |

Many sub events may have happened to cause the event. For example, in "Capture the Flag," the system can trace the path the flag took from the initial taking of the flag all the way to the capture of the flag. There may have been dozens of people who carried the flag and dropped the flag along the way. There may have been several long distance kills of the flag carrier. There may have been several mines that blew up around the flag carrier, or killed the flag carrier. In those cases, the system can also show the mines being placed, then zoom forward in time to them blowing up the flag carrier. Even the initial flag take has sub events of the player approaching and taking the flag.

The system can chose the amount of events and sub events to display depending on the desired length of replay. For example, if a flag capture is desired to be shown, the system could designate five seconds of time to the initial flag take, 20 seconds of flag carrying, possibly showing five seconds of the top four events while the flag was carried, and the final five seconds before the flag capture.

Figure 5:
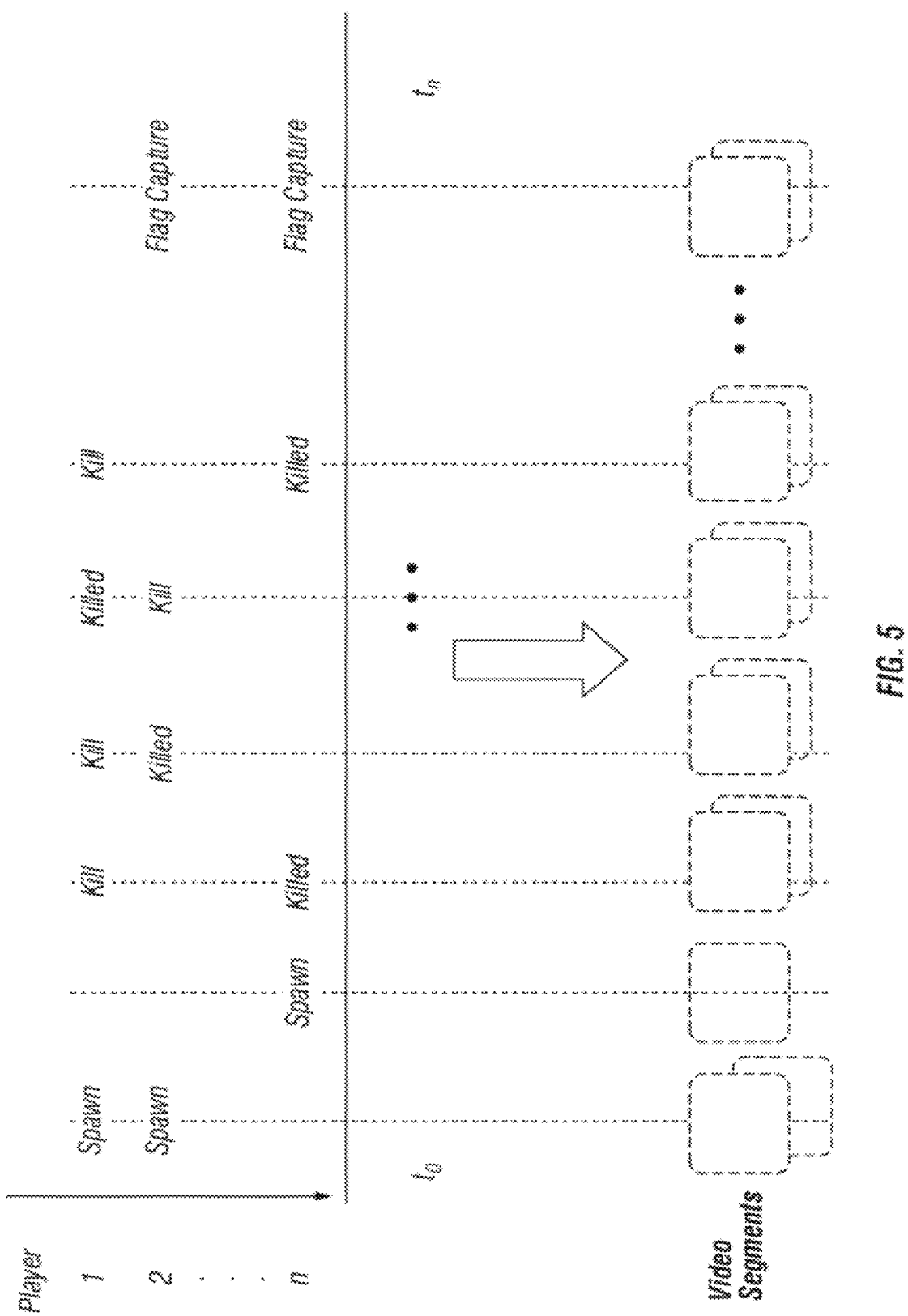
FIG. 5 is a schematic diagram showing a game play timeline and resulting video content according to an embodiment of the invention.

FIG. 5 is a schematic diagram showing a game play timeline and resulting video content according to an embodiment of the invention. In FIG. 5, players 1, 2, and n are shown spawning, killing and being killed, and capturing a flag. The events occur along a timeline. The event information is used to generate video segments that are then combined to produce a highlight video of the game. In FIG. 5, the video segments in which two or more players are linked by a common activity are combined to show both players' perspective, although this is not necessary in some embodiments. In FIG. 5, for example, two video segments are shown form players 1 and 2 spawning because the both spawned at the same time. This relationship might prove to be significant when a highlight video is assembled. Likewise, when a player kills another player, both players' experience is captured as a separate video segment. As can be seen, in the example of FIG. 5, players 2 and n cooperated to capture the flag and, thus, video segments for each of them are provided.

Further, a competitive dimension may be added, where tagged events in which top rated players appear are given greater weight to produce a video based, at least in part, on the rankings of the players who participated in a particular game.

An embodiment of the invention contemplates the selection of highlights from among highlight videos from several games. This embodiment thus provides a highlight video selected from among the highlights of several games. Thus, a user may request a video be prepared that shows all of that user's tagged events from all games played by that user. Alternatively, highlights from several games can be selected based upon a particular event, for example, the top ten flag captures. Further, a voting community may select highlights. Such community may comprise, for example, each player who participated in a particular game, top rated players, a "board of editors," a coterie of spectators, and the like.

Figure 6:
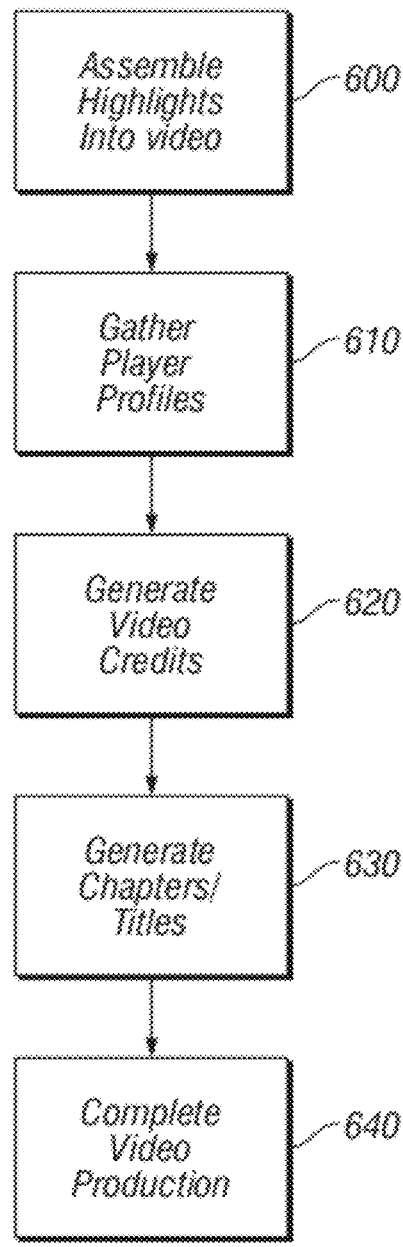
FIG. 6 is a logic diagram showing operation of the invention during production of a game highlight video according to an embodiment of the invention.

FIG. 6 is a logic diagram showing operation of the invention during production of a game highlight video according to an embodiment of the invention. One embodiment of the invention automatically edits events into a video and further adds such video elements as a title, cast of players, and chapters. Along these same lines, a further dimension of selection can include a personal dimension, in which a personalized video is prepared for each user, based on that user's tagging. This embodiment of the invention also provides the ability to create a narrative of one or more game play events. For example, for example game history can be stored for all events from multiple perspectives. Thus, each player's role in capturing a flag can be portrayed either in order, i.e. sequentially, or as a series of dissolves from one player to another player, such that a time line of actions is depicted from each player, leading up to the event. In this way, the invention can build a story around an event. Further, an event that is otherwise viewed by each player from their own perspective can be assembled into a multi-perspective view or series of views to allow an event, such as an explosion, to be viewed from all possible angles. In one embodiment, each perspective could be presented as part of a split screen view, while in another embodiment, transitions, cuts, and the like between perspectives are automatically inserted into the video.

In FIG. 6, the highlights, as represented the various events, are assembled into a video (600), based upon the various factors described above. The player profiles are also gathered (610) from the game server or from other sources, such as the player's game console, webpage, blog, or the like. The player profile information is used to generate video credits (620), which are then appended to the video, for example at the end. The credits can include the player's game play name and the player's avatar, for example. A series of chapters and/or titles can also be generated (630). For example, each chapter can provide direct access from a first level menu to a particular event. Likewise, the video, as well as each chapter, can be entitled, based upon event related metadata. Finally, the video is completed (640) and can be distributed, as discussed elsewhere herein.

Various tools are provided in an embodiment that enhance the presentation aspects of the video. For example, as discussed above, a title and cast of characters can be automatically appended to the beginning and/or end of the video, for example based upon profile information for each player. Thus, each player depicted in an event may be featured as a star of the video in the video credits. This same user information can also be used to highlight or otherwise distinguish one or more players, for example, the network ID or the username associated with a character is highlighted and presented in the video so that individual users are clearly distinguished for their actions. Thus, a flag carriers would have a more distinct (and valued) presentation of their avatar in this embodiment.

An embodiment of the invention also provides for export of the video highlights from one or more games. Thus, a user may export one or more events from a game to the World Wide Web, for example for display on YouTube™. Such user generated content can be shared, for example at social networking sites, such a Facebook™ or MySpace™. In this embodiment, videos can be automatically generated based upon machine heuristics, based upon user preferences applied to the video generation process using machine automation, or manually edited by each game player. In this latter category, each player may present their video and receive appropriate recognition from the game player community, for example an award for the most interesting, most exciting, or funniest video.

Figure 7A:
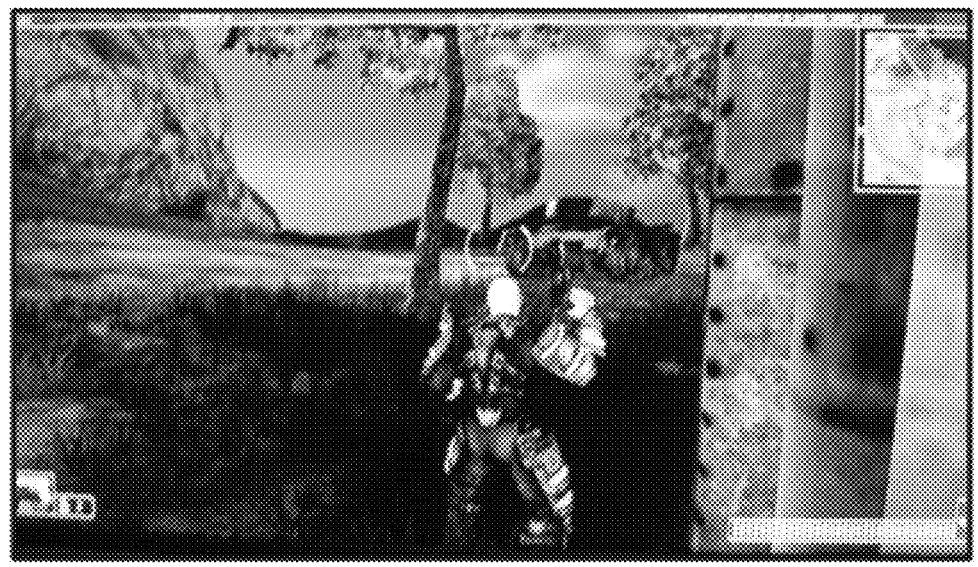
FIGS. 7a-7n show an edited game play sequence as produced in accordance with the invention.
Figure 7B:
Figure 7C:
Figure 7D:
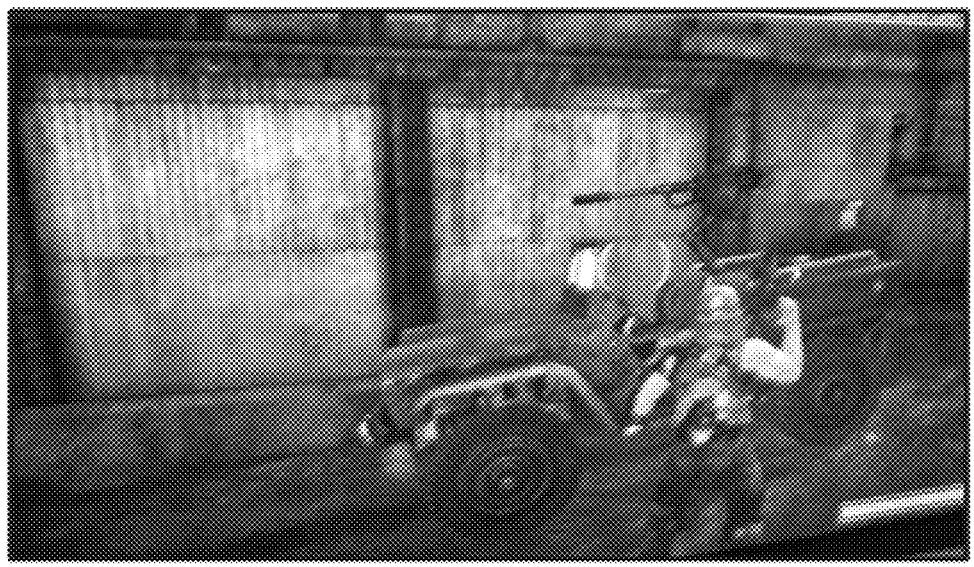
Figure 7E:
Figure 7F:
Figure 7G:
Figure 7H:
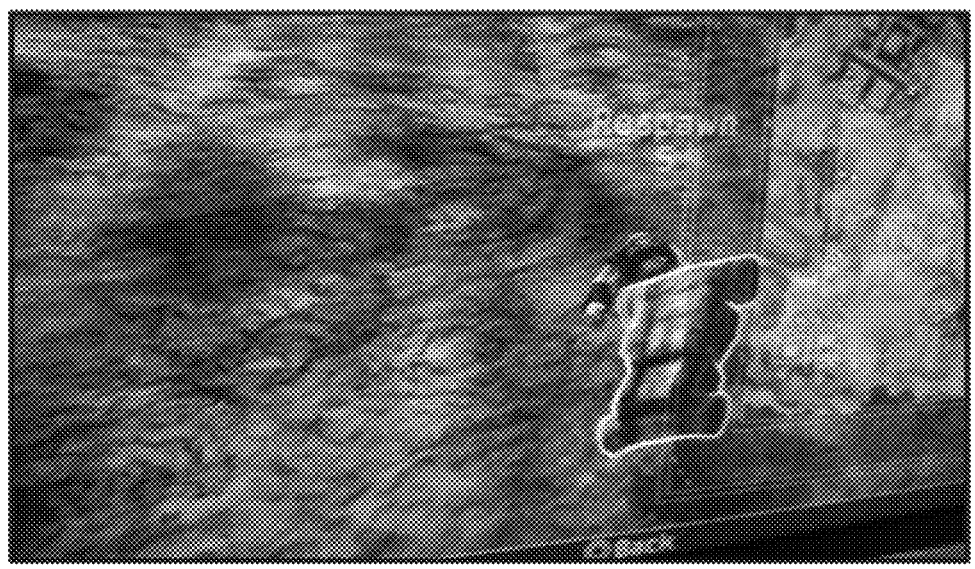
Figure 7I:
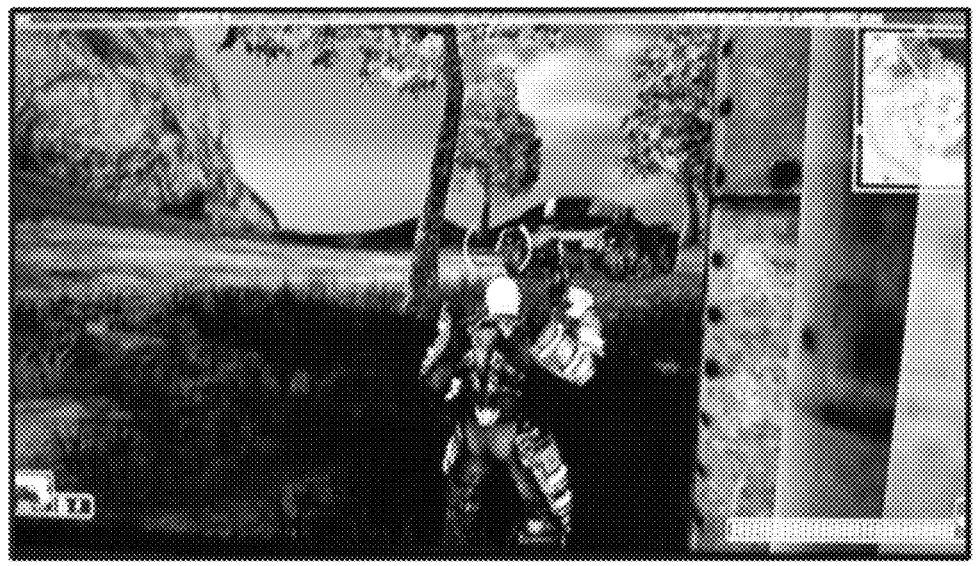
Figure 7J:
Figure 7K:
Figure 7L:
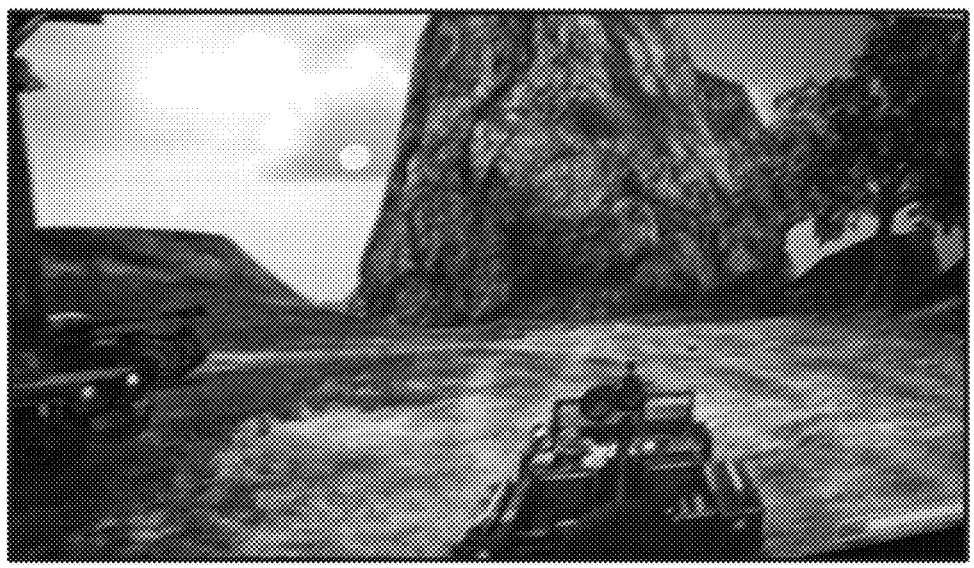
Figure 7M:
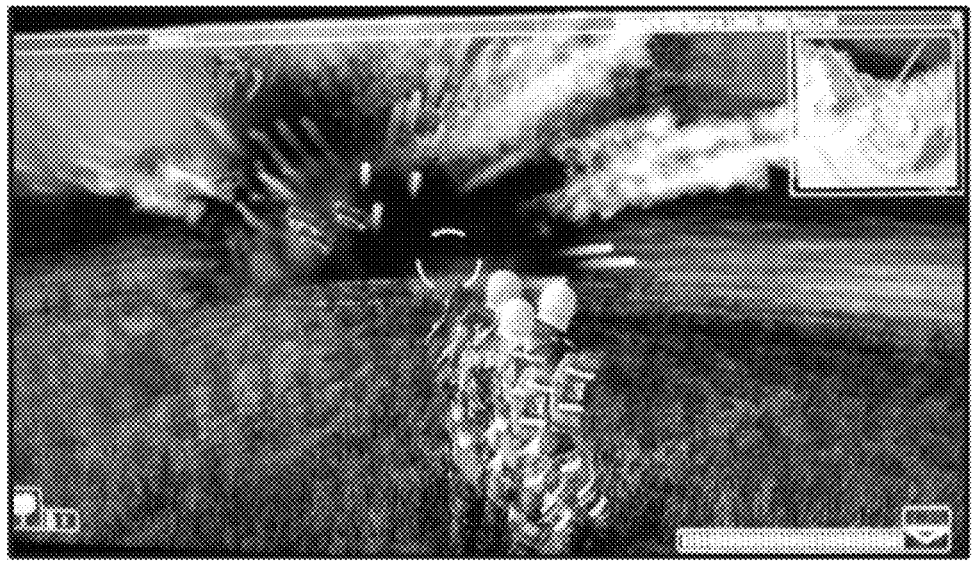
Figure 7N:
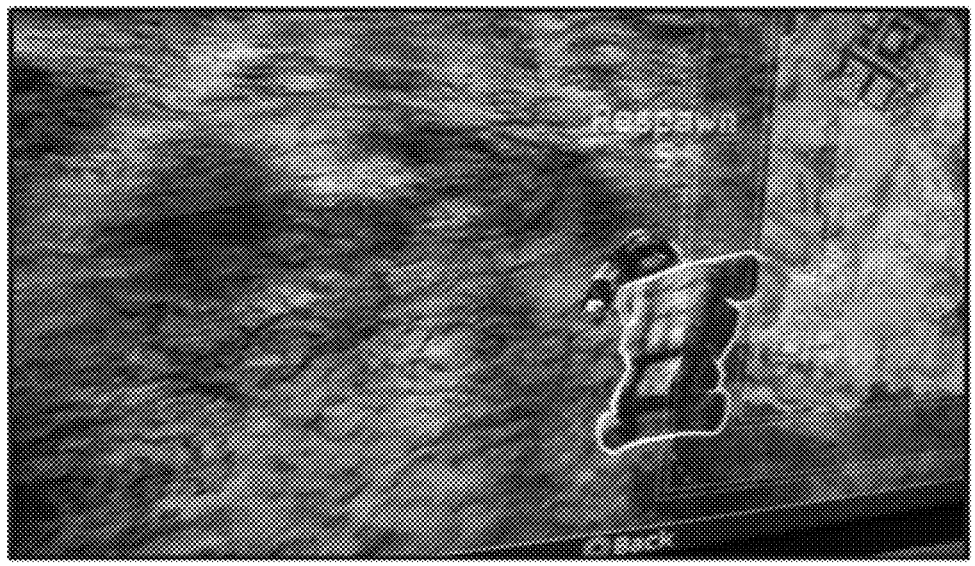

FIGS. 7a-7n show an edited game play sequence as produced in accordance with the invention. In particular, FIGS. 7a-7h show a first view sequence and FIGS. 7i-7n show an alternate view sequence.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for automated creation of videos for interactive entertainment involving at least one individual, based on events that occur within that interactive entertainment, comprising:
   (a) storing a video history of a session of the interactive entertainment for an individual;
   (b) examining the interactive entertainment for the session to identify events designated as significant, wherein the events are designated as significant based on performance by the individual in relation to events that occur during the session of the interactive entertainment, the designation of an event as significant is based on number of votes received for the event from multiple individuals meeting a predefined threshold, wherein
   the multiple individuals are participants or observers of at least part of the session of the interactive entertainment or viewers of the stored video history
   (c) selecting segments of video from the video history of the session of the interactive entertainment, the selected segments being for a set of the identified events;

(d) generating a video defined from the selected segments of video, the video being playable to show the selected segments of video in a selected order for the individual; and (e) storing the video; and wherein the method being executed by a processor.

2. The method of claim 1, wherein the video of the selected segments is a highlight video of certain ones of the events designated as significant.

3. The method of claim 1, wherein when the session is for interactive entertainment involving multiple individuals, the method executes operations (a) to (b), and then executes operations (c) to (e) for each of the multiple individuals by selecting the segments of videos most relevant to each of the multiple individuals.

4. The method of claim 1, wherein the threshold is met when events are tagged by the individual for which the video is generated in operation (d).

5. The method of claim 1, wherein the voting facilitated through selection of icons, buttons, or indicators of liking or disliking.

6. The method of claim 1, wherein the voting providing an indication of the events of the individual that are found to be entertaining and meeting the threshold.

7. The method of claim 1, wherein the selecting of segments in operation (c) is performed automatically based on events known to be significant in the interactive entertainment.

8. The method of claim 1, wherein the interactive entertainment is one of a video game or an online video game.

9. The method of claim 1, wherein the selecting of segments in operation (c) is performed in response to tagging of particular events by the individual during the game session.

10. The method of claim 9, wherein a subset of the tagged events by the individual are generated into the video.

11. The method of claim 1, wherein the threshold is defined by applying ranking of the events by popularity, as determined by a plurality of individuals.

12. The method of claim 1, wherein the generating of the video in operation (d) is performed automatically upon completion of the session.

13. The method of claim 1, wherein upon completion of the session, the video is shared to a plurality of predefined individuals over the internet, the plurality of individuals enabled to provide voting regarding the events in the video.

14. The method of claim 13, wherein the voting of the events for the session are stored and accessed to automatically rate similar events in other sessions by other individuals.

15. The method of claim 1, wherein the video arranges the segments in a timeline corresponding to the session.

16. A system for automated creation of videos for interactive entertainment involving at least one individual, based on events that occur within that interactive entertainment, comprising:

a client device for executing the interactive entertainment, the client device being connected to a server over the internet, the client device having logic for storing a video history of a session of the interactive entertainment for an individual;

logic on the client device and logic on the server configured for identifying events designated as significant, wherein the events are designated as significant based on performance by the individual in relation to events that occur during session of the interactive entertainment, the designation of an event as significant is based on number of votes received for the event from multiple individuals meeting a predefined threshold, wherein the multiple individuals are participants or observers of at least part of the session of the interactive entertainment or viewers of the stored video history;

logic on the client device and logic on the server configured for selecting segments of video from the video history of the session of the interactive entertainment, the selected segments being for a set of the identified events;

logic on the client device and logic on the server configured for generating a video defined from the selected segments of video, the video being playable to show the selected segments of video in a selected order for the individual; and logic on the client device and logic on the server configured for saving storing the video, the video being shareable over the internet.

17. The system of claim 16, wherein the client device is a game console and the server is a game server.

18. A non-transitory computer readable media having program instructions for automated creation of videos for interactive entertainment involving at least one individual, based on events that occur within that interactive entertainment, the computer readable media comprising:

(a) program instructions for storing a video history of a session of the interactive entertainment for an individual;

(b) program instructions for examining the interactive entertainment for the session to identify events designated as significant, wherein the events are designated as significant based on performance by the individual in relation to events that occur during the session of the interactive entertainment, the designation of an event as significant is based on number of votes received for the event from multiple individuals, wherein the multiple individuals are participants or observers of at least part of the session of the interactive entertainment or viewers of the stored video history;

(c) program instructions for selecting segments of video from the video history of the session of the interactive entertainment, the selected segments being for a set of the identified events;

(d) program instructions for generating a video defined from the selected segments of video, the video being playable to show the selected segments of video in a selected order for the individual; and (e) program instructions for storing the video.

19. The computer readable media of claim 18, further comprising, (f) program instructions for generating any of several combinations of views of said video, each view corresponding to a series of the events that occurred during said interactive entertainment for a respective one of each of said multiple individuals.

* * * * *

UNITED STATES PATENT AND TRADEMARK OFFICE
CERTIFICATE OF CORRECTION

PATENT NO. : 8,929,721 B2
APPLICATION NO. : 13/365140
DATED : January 6, 2015
INVENTOR(S) : David Cottrell Page 1 of 1

It is certified that error appears in the above-identified patent and that said Letters Patent is hereby corrected as shown below:

Title Page, item (73) Assignee: "Sony Computer Engineering America LLC, San Mateo, CA (US)" should be changed to the correct Assignee: "Sony Computer Entertainment America LLC, San Mateo, CA (US)".

Signed and Sealed this
Fifth Day of May, 2015

Michelle K. Lee
*Director of the United States Patent and Trademark Office*